United States Patent [19]

Stapp

[11] Patent Number: 4,491,525
[45] Date of Patent: Jan. 1, 1985

[54] OIL RECOVERY WITH SURFACTANT FLOODING

[75] Inventor: Paul R. Stapp, Bartlesville, Okla.

[73] Assignee: Phillips Petroleum Company, Bartlesville, Okla.

[21] Appl. No.: 358,983

[22] Filed: Mar. 17, 1982

Related U.S. Application Data

[62] Division of Ser. No. 186,862, Sep. 12, 1980, Pat. No. 4,335,787.

[51] Int. Cl.³ .................................................. E21B 43/22
[52] U.S. Cl. .................................. 252/8.55 D; 166/273; 252/355
[58] Field of Search ............ 166/273, 274, 275, 305 R; 252/8.55 D, 8.55 B, 8.55 C, 363.5, 355, 141

[56] References Cited

U.S. PATENT DOCUMENTS

| | | | |
|---|---|---|---|
| 2,356,205 | 8/1944 | Blair et al. | 252/8.55 |
| 2,383,526 | 8/1945 | Tucker | 252/141 |
| 2,830,018 | 4/1958 | Thompson et al. | 166/274 |
| 3,361,722 | 1/1968 | Prem et al. | 252/355 X |
| 3,373,809 | 3/1968 | Cooke | 166/273 |
| 3,446,282 | 5/1969 | Cooke | 252/8.55 X |
| 3,497,006 | 2/1970 | Jones et al. | 166/273 |
| 3,506,588 | 4/1970 | Selz | 252/353 X |
| 3,698,479 | 10/1972 | Askew et al. | 166/273 |
| 3,811,505 | 5/1974 | Flournoy et al. | 252/8.55 X |
| 4,079,785 | 3/1978 | Hessert et al. | 252/8.55 X |
| 4,274,279 | 6/1981 | Meister | 73/55 |

FOREIGN PATENT DOCUMENTS 2733970  2/1979  Fed. Rep. of Germany ...... 252/141

*Primary Examiner*—Herbert B. Guynn
*Attorney, Agent, or Firm*—Bernhard H. Geissler

[57] ABSTRACT

A surfactant system useful for oil recovery comprises a surfactant, such as a petroleum sulfonate, and a nitrile cosurfactant, such as acrylonitrile.

9 Claims, No Drawings

OIL RECOVERY WITH SURFACTANT FLOODING

This application is a division of application Ser. No. 186,862, filed Sept. 12, 1980, now U.S. Pat. No. 4,335,787.

This invention relates to surfactant systems. More specifically, this invention relates to the use of new surfactant systems in oil recovery.

BACKGROUND OF THE INVENTION

Water flooding and surfactant flooding are processes well known in the art to recover the vast quantities of oil which remain in the formation after primary oil recovery operations. Designing new surfactant systems of high oil recovery and efficiency and good emulsion stability remains a goal in this technology.

THE INVENTION

It is one object of this invention to provide a new and relatively inexpensive surfactant system for oil recovery.

Another object of this invention is to provide a process for tertiary oil recovery which utilizes a surfactant system comprising surfactant and cosurfactant for efficient oil recovery.

A further object of this invention resides in the provision of a surfactant system useful in surfactant flooding oil recovery in environments comprising hard brines.

Still a further object of this invention is to provide an oil recovery process in which a large percentage of the surfactant used is recovered with the fluids produced.

These and other objects, advantages, details, features and embodiments of this invention will become apparent to those skilled in the art from the following detailed description of the invention and the appended claims.

In accordance with this invention is has been found that nitriles can be efficiently used as cosurfactants in surfactant flooding operations for oil recovery.

Thus, in accordance with a first embodiment of this invention, there is provided a new surfactant comprising a hydrocarbon sulfonate surfactant and a nitrile as a cosurfactant.

SURFACTANT SYSTEM

The preferred surfactant system of this invention is an aqueous system, optionally containing a protective agent. Generally, water is used containing a certain quantity of sodium chloride for practical reasons. Typical and preferred compositions of a surfactant system of this invention are shown in the following table.

TABLE

| INGREDIENT | BROAD RANGE | PREFERRED RANGE |
|---|---|---|
| Water (parts by weight) | 100 | 100 |
| Hydrocarbon Sulfonate* (active parts by weight) | 0.1–15 | 1–12 |
| Nitrile (parts by weight) | 0.05–15 | 1–7 |
| Protective Agent (parts by weight) | 0.01–3 | 0.05–2 |
| NaCl (parts by weight) | 0–10 | 0.1–8 |

*The ranges for the active hydrocarbon sulfonate (e.g. petroleum sulfonate) in parts by weight. The "active" value is readily determined by multiplying parts by weight used and the percentage of active ingredients in the product.

SURFACTANT

The surfactant used in the surfactant system of this invention is a hydrocarbon sulfonate. It can be made from relatively pure hydrocarbons and hydrocarbon mixtures. The preferred surfactant is a petroleum sulfonate. The petroleum sulfonates are commercially available products. The presently preferred surfactants used in oil recovery are petroleum sulfonates having an average equivalent weight in the range of 325 to 600. Best results with presently known reservoirs are believed to be obtainable with petroleum sulfonates having average equivalent weights of about 325 to 500.

COSURFACTANTS

In accordance with this invention nitriles are used as cosurfactants. These nitriles are characterized as having one or more —CN groups in an organic molecule. The organic molecule can also contain other elements such as oxygen, nitrogen and sulfur. More specifically, the nitriles useful in accordance with this invention have one to three —CN groups attached to carbon atoms of a molecule containing up to thirteen carbon atoms and up to four oxygen and/or sulfur atoms and up to four additional nitrogen atoms. The oxygen, sulfur and additional nitrogen atoms of these molecules may be heterocyclic; the carbon atoms of the molecule may be either saturated or unsaturated and aliphatic or aromatic.

Suitable nitriles are described by the formula (I)

$$R—(CN)_n \qquad (I)$$

wherein R is a n-valent radical such as alkyl, alkylene, alkenyl, alkenylene, aryl, or aralkyl and n varies over the range of 1 to 3 with the proviso that the total number of carbon atoms does not exceed 13. Representative examples include acetonitrile; propionitrile; butyronitrile; tridecanenitrile; benzonitrile; phenylacetonitrile; acrylonitrile; methacrylonitrile; vinylacetonitrile; succinonitrile; 1,3-dicyanopropene; tris(cyanoethyl)methane; 1,1-dicyanoethane and the like and mixtures thereof.

Additional nitrile compositions suitable for use as cosurfactants in the instant invention include the cyanoalkylated compounds resulting from the interaction of α,β-unsaturated nitriles especially such as acrylonitrile and methacrylonitrile with active hydrogen-containing materials. In addition to water, ammonia and hydrogen sulfide, other active hydrogen-containing compositions suitable for cyanoalkylation by methods known to the art are described by the formula (II)

$$R'''—(Q)_n \qquad (II)$$

wherein R''' is an n-valent radical such as alkyl, aryl, aralkyl, alkenyl and arylene and n varies over the range of 1 to 3 with the total number of carbon atoms limited to 15 or less. The Q moieties can be the same or different and represent individually —H, —OH, —SH, —NH$_2$, —NHL, —NL$_2$, —OL, —SL or any combination of said groups with the proviso that at least one of said Q groups contains at least one hydrogen bonded directly to oxygen, sulfur or nitrogen and L is an alkyl radical containing 1 to 6 carbon atoms.

It is contemplated that selected cyclic structures described by the formula (III) can be cyanoalkylated to useful cosurfactant compounds:

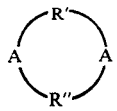
(III)

wherein R' and R" may be the same or different divalent alkylene radicals and A represents a valence bond, —NH—, oxygen (—O—) or sulfur (—S—) with the proviso that at least one A is —NH— and the total number of carbon atoms in said compounds does not exceed 6.

In accordance with the above general formula, suitable cyanoalkylated compositions which are useful cosurfactants include the following: 1-phenoxy-2-cyanoethane; 1-ethoxy-2-cyanoethane; 1-butoxy-2-cyanopropane; 1-decyloxy-2-cyanoethane; 1-dodecyloxy-2-cyanopropane; 1-(p-hexylphenoxy)-2-cyanoethane; 1-pentadecyloxy-2-cyanopropane; 1-phenyl mercapto-2-cyanoethane; 1-propylmercapto-2-cyanopropane; 1-hexylmercapto-1-cyanoethane; 1-dodecylmercapto-2-cyanoethane; 1-(p-nonylphenylmercapto)-2-cyanopropane; 1-pentadecylmercapto-2-cyanoethane; N,N-bis($\beta$-cyanoethyl)-1-aminobutane; N,N-bis($\beta$-cyanopropyl)-1-aminododecane; N,N-bis($\beta$-cyanoethyl)-1-aminopropane; N,N-diethylamino-2-cyanoethane; N,N-bis($\beta$-cyanopropyl)-1-aminooctane; 1-($\beta$-cyanoethoxy)-2-($\beta$-cyanoethylmercapto)ethane; 1-[N,N-bis($\beta$-cyanoethylamino)]-2-($\beta$-cyanoethylmercapto) ethane; 1,2-bis($\beta$-cyanopropoxy)ethane; N,N,N'N'-tetrakis($\beta$-cyanopropyl)-1,2-diaminoethane; N,N'-bis($\beta$-cyanopropyl)-1,2-diamino ethane; 1,2-bis($\beta$-cyanopropylmercapto)ethane; 1-($\beta$-cyanoethoxy)-N-($\beta$-cyanoethylamino)ethane; 1-($\beta$-cyanoethoxy)-N,N-($\beta$-cyanoethylamino)ethane; N-$\beta$-cyanoethylmorpholine; 1-($\beta$-cyanoethoxy)-2-(methoxy)ethane; 1-($\beta$-cyanoethoxy)-2-(N,N-diethylamino)ethane; 1-(ethoxy)-2-bis(N,N-$\beta$-cyanopropylamino)ethane; 1-(methyl-mercapto)-2-($\beta$-cyanopropoxy)ethane; 1-(ethoxy)-3-($\beta$-cyanoethylmercapto)propane; 1-(N,N-dimethylamino)-2-($\beta$-cyanopropylmercapto)ethane; 1-(ethyl-mercapto)-2-bis(N,N-$\beta$-cyanoethylamino)ethane; N-$\beta$-cyanoethylpiperidine; N,N-bis($\beta$-cyanopropyl)piperazine; 1,2,3-tris($\beta$-cyanoethoxy)propane; N,N,N-tris($\beta$-cyanoethoxyethyl)amine; N,N-bis($\beta$-cyanopropoxyethyl)aminoethane; and mixtures thereof.

The cyanoalkylation art has been reviewed in Vol. 5 of "Organic Reactions" (Ch. 2) and in "The Chemistry of Acrylonitrile" (published by American Cyanamid Company, Copyright 1959). Numerous examples of compositions prepared by cyanoalkylation suitable for use as cosurfactants in the instant processes can be found in these reviews. The foregoing specific examples of cyanoalkylated materials cited hereinabove are intended to be representative and in no way unduly limiting in regard to the scope of the instant disclosure. It is contemplated that many additional specific examples in the above mentioned references within the scope of the present teaching are suitable for use as cosurfactants in the instant process.

In the preferred use of the surfactant system of this invention in oil recovery, the nitriles preferably have two to twenty carbon atoms and a water solubility of 0.1 to 20, preferably 1–10 grams per 100 grams of water.

OIL RECOVERY PROCESS

An oil recovery process using the surfactant system of this invention as defined above constitutes another embodiment of this invention. This process involves generally the conventional steps of post primary oil recovery and distinguishes over the known procedures primarily in the use of the nitriles defined as cosurfactants.

PREFLUSH

It is optional, although not necessary, to carry out a preflush step preceding the further oil recovery operation. Such preflush operations are known in the art. Generally, a brine compatible with the surfactant system is injected via at least one injection well into the subterranean formation. Such a brine typically contains 2000–50,000 ppm salts, predominantly sodium chloride. Preferably a brine solution as utilized in the production of the surfactant system is also used in this preflush step.

The quantity of the preflush employed will generally be in a range of about 0.01 to 2, preferably 0.25 to 1 pore volume, based on the total pore volume of the formation or reservoir subjected to the recovery.

SURFACTANT FLOODING

After the optional preflush step the surfactant fluid of this invention is injected into the reservoir via at least one injection well. The surfactant system is injected in an amount usually in the range of about 0.001 to 1.0, preferably 0.01 to 0.25 pore volume based again on the pore volume of the total treated and produced formation.

The preferred operation makes use of the surfactant system in the form of a multiphase system including at least one microemulsion phase. Usually the surfactant system contains as the main ingredient water, the surfactant and the nitrile as the cosurfactant. These ingredients are thoroughly mixed and then introduced into the formation via one or more injection wells. However, the in-situ formation of a microemulsion in the formation, e.g. by simultaneous but unmixed injection or by alternating the injection of surfactant and cosurfactant is also within the scope of this invention.

Generally, the microemulsion is formed in the reservoir after the surfactant system is injected as a solution containing surfactant and cosurfactant in brine.

The present invention can be utilized for a variety of subterranean reservoirs. The invention is, however, particularly preferred in reservoirs containing hard brine connate water. Such hard brines are characterized by a high content of Mg++ and Ca++ ions in the reservoir water. Typical hard brines contain more than 100 ppm of Ca++ and/or Mg++.

Protective agents are an especially preferred ingredient in the surfactant system of this invention when used for oil recovery from reservoirs with hard brines. Examples for such protecting agents are polyethoxylated fatty alcohols and polyethoxylated alkylphenols. In addition, the sodium salts of sulfated polyethoxylated fatty alcohols and polyethoxylated alkylphenols are known in the art to function as protective agents.

MOBILITY BUFFER

Following the surfactant slug it is presently preferred, although again not necessary, to inject a mobility buffer solution into the reservoir. This buffer helps prevent fingering and enhances the efficiency of the oil recovery. Buffer solutions are aqueous solutions of polymers or thickening agents. Examples of useful mobility buffers are aqueous and nonaqueous fluids containing mobility reducing agents such as high molecular weight partially hydrolyzed polyacrylamides, polysaccharides, soluble cellulose ethers and the like. The mobility buffer comprises 50 to 20,000, preferably 200 to 5,000 ppm of the mobility reducing agent in the fluid.

The injection of the mobility buffer fluid can be at a constant composition or the mobility buffer can be graded, i.e. the injection starts out at a relatively high concentration at the leading edge and the concentration tapers off toward the trailing edge. As an example the mobility buffer can start with a concentration of 2500 ppm of polyacrylamide in the water and end with 250 ppm of polyacrylamide in water. These mobility buffer fluids are well known in the art.

The invention will be still more fully understood from the following detailed examples which are intended for illustrative purposes only and not for an undue limitation of the scope of this invention.

EXAMPLE I

In this example the phase behavior of a surfactant system comprising a nitrile as cosurfactant is tested. The surfactant system was made by thoroughly mixing the following ingredients:

| | |
|---|---|
| Witco 10-410* @ 62% active ingredient | 20.32 grams (3.6 wt. %) |
| Acrylonitrile | 10.50 grams (3.0 wt. %) |
| Distilled Water | 319.18 grams |

*Petroleum sulfonate having an average equivalent weight of about 420, commercially available from Witco Chemical Company.

Several 25 mL samples of this aqueous surfactant system with varying quantities of sodium chloride (from 5,000 to 80,000 ppm NaCl) were thoroughly mixed with 15 mL of a simulated North Burbank crude. This simulated North Burbank crude was made by first purging actual North Burbank crude oil with nitrogen and thereafter adding ethylbenzene to this oil to make the oil mixture similar in its phase behavior to the actual crude oil.

The 40 mL sample mixture of the surfactant fluid and the simulated oil were allowed to phase separate in graduated cylinders placed in a bath kept at a constant temperature of 120° F. by thermostatic control. The respective volumes of the phases occurring after phase separation were recorded and the percentages of these phases calculated. In Table I showing the results of this example it can be seen that a phase separation involving microemulsion middle phase occurs over a wide range of sodium chloride concentration, e.g., 22,000 ppm to 60,000 ppm NaCl.

TABLE I

| NaCl Conc. ppm | First Interface mL | Second Interface mL |
|---|---|---|
| 5K | 26.0 | — |
| 10K | 24.0 | — |
| 15K | 25.0 | — |
| 20K | 22.0 | — |
| 21K | 29.8 | — |
| 22K | 8.7 | 30.0 |
| 23K | 13.7 | 30.2 |
| 25K | 13.9 | 30.9 |
| 40K | 20.4 | 31.0 |
| 50K | 20.5 | 26.0 |
| 60K | 21.0 | 25.0 |
| 80K | — | 24.0 |

EXAMPLE II

Example I was repeated using, however, instead of the surfactant system in Example I the following system:

| | |
|---|---|
| Petrostep 465* @ 59.4% active ingredient | 21.21 g (3.6 wt. %) |
| Acrylonitrile | 10.50 g (3.0 wt. %) |
| Distilled Water | 318.19 g |

*A petroleum sulfonate having an average equivalent weight of 465 and a broad range of equivalent weight distribution, commercially available from Stepan Chemical Company (lot no. 504); the petroleum Petrostep 465 has a higher average equivalent weight and a broader equivalent weight range distribution than the previously used petroleum sulfonate.

The actual determined phase volume values are also shown in the following Table II.

TABLE II

| NaCl Conc. ppm | First Interface mL | Second Interface mL |
|---|---|---|
| 5K | 26.0 | — |
| 10K | 26.6 | — |
| 15K | 26.9 | — |
| 20K | 27.0 | — |
| 21K | 27.1 | — |
| 22K | 27.2 | — |
| 23K | 16.4 | 27.0 |
| 25K | 18.6 | 27.0 |
| 40K | 21.5 | 27.2 |
| 60K | 23.1 | 27.2 |
| 70K | 23.0 | 27.1 |
| 80K | 23.9 | 27.9 |
| 90K | 23.9 | 27.8 |
| 100K | 22.6 | 25.3 |

The above results demonstrate that the surfactant system of this invention results in a desirable phase behavior and the formation of a microemulsion phase over a broad range of sodium chloride concentrations, e.g., 23,000 ppm to about 100,000 ppm NaCl.

EXAMPLE III

A series of phase behavior runs were made using essentially the technology described above. The oil used for these examples was nonane, the brine used was either salt water or Hendrick's Reef Water (see footnote in Table III) as the brine. Two different petroleum sulfonates and two different nitriles in varying concentrations were used. The temperature at which the mixtures were allowed to settle was 100° F. except where otherwise noted. Usually ten individual samples were made for each run in accordance with the recipe shown in the table, the samples differing in their salt content. Each sample was composed of 25 mL surfactant solution and 15 mL nonane. The specific brine concentrations were achieved by starting from a tenfold concentrated HRW sample (10 units) and diluting portions thereof in volume ratio of, e.g., 1:99 with distilled water to achieve a 1/100 or a 0.1 unit HRW concentration. The results of the phase volume measurements are shown in Table III.

TABLE III

| | Surfactant Systems Containing Nitrile Cosurfactants | | | | | |
|---|---|---|---|---|---|---|
| Run | Petroleum Sulfonate | Cosurfactant/ Wt. % | | Protective Agent/Wt. % | | 3-Phase Salinity Region (HRW Units)[1] |
| 1 | W[2] | A[4] | 3 | T[5] | 0.5 | 1.35 |
| 2 | W | A | 3 | E[6] | 0.5 | 0.85 |
| 3 | 88[3] | A | 3 | E | 0.5 | 0.75 |
| 4 | 88 | A | 3 | T | 0.5 | >3.1 |

TABLE III-continued

Surfactant Systems Containing Nitrile Cosurfactants

| Run | Petroleum Sulfonate | Cosurfactant/ Wt. % | | Protective Agent/Wt. % | | 3-Phase Salinity Region (HRW Units)[1] |
|---|---|---|---|---|---|---|
| 5 | 88 | A | 3 | T | 0.5 | 0.6 |
| 6 | 88 | A | 5 | E | 0.5 | >3.2 |
| 7 | W | A | 5 | E | 0.5 | 0.35 |
| 8 | W | P[4] | 3 | None | | 0.75[1a] |
| 9 | W | P | 3 | None | | 1.5; 2[1a] |
| 10 | 88 | P | 1 | None | | 3.5[1a] |
| 11 | 88 | P | 3 | None | | 2.8[1a] |
| 12 | W | P | 5 | E | 0.5 | 1.85; 1 |
| 13 | 88 | P | 5 | E | 0.5 | >2.85 |
| 14 | 88 | P | 3 | E | 0.04 | 2.85 |
| 15 | 88 | P | 3 | None | | 1.25 |
| 16 | 88 | P | 3 | E | 0.04 | 1.5 |
| 17 | 88 | P | 5 | E | 0.04 | >2.88 |

[1]*HRW Units represent Hendricks Reef Water Unit. The 3-phase region is expressed in terms of HRW units wherein one HRW unit corresponds to the aqueous brine composition containing 1.12 weight percent total solids, 900 ppm Ca++ and 300 ppm Mg++; it follows, e.g., that two HRW units corresponds to the aqueous brine composition containing 2.24 weight percent total solids, 1800 ppm Ca++ and 600 ppm Mg++. In cases wherein the 3-phase region was still evident at the maximum salinity observed, the symbol > ("more than") is used before the number of HRW units in said range.
[1a]These values specify optimal salinity range expressed as weight percent NaCl in these sodium chloride brines.
[2]W represents Witco Chemical Company's petroleum sulfonate TRS 10-410 with an average equivalent weight of 417 (62% active). A 5.8 weight % concentration of this material was used in the indicated runs to give a concentration of 3.6% active material.
[3]88 represents an experimental petroleum sulfonate (70% active). A 5.1 weight % concentration of this material was used in the indicated runs to give a concentration of 3.6% active material. This material possessed an average equivalent weight of 376.
[4]A represents acrylonitrile and P represents propionitrile.
[5]T represents Tergitol NP-44 a protective agent commercially available from Union Carbide Corp. (polyethoxylated nonylphenol).
[6]E represents Ethosperse LA-12 a protective agent commercially available from Glyco Chemicals, Inc. (polyethoxylated lauryl alcohol).
[7]Equilibration was carried out at 100° F. in 11a and 72° F. in 11b.
[8]Equilibration was carried out at 72° F. in 15a and 100° F. in 15b.

EXAMPLE IV

A Berea sandstone core of 3 foot length and 3 inch diameter having a pore volume of 847 cc was prepared in the usual manner by coating its cylindrical surface with an epoxy resin leaving only the plane opposing faces of the core accessible to the fluids. Under horizontal flow conditions this core was first evacuated, dried and thereafter saturated with a brine containing 22,000 ppm sodium chloride. Thereafter a simulated live North Burbank oil as described in Example I was caused to flow through the core sample. Phase separation of the effluent and recycle of the simulated North Burbank oil was utilized until no more water came out of the core.

Thereafter the core was water flooded by pumping the brine described above through the core until no more oil comes through the core. The core permeabilities were:

| | |
|---|---|
| Original perm to water: | 4.2 cc/min. (at 3.0 psi) |
| Oil Perm at brine: | 6.3 cc/min. (at 22.3 psi) |
| Perm after waterflood: | 6.2 cc/min. (at 30.0 psi) |

The following table is a listing of, respectively, the volumes of the water and oil displaced or remaining in the core.

| | |
|---|---|
| Water displaced by oilflood: | 609.9 cc (total) |
| Oil displaced by waterflood: | 297.5 cc (total) |
| Oil remaining in core after waterflood: | 312.4 cc (total) |

A surfactant solution having a volume of 63.5 cc, or 7 pore volume percent was thereafter injected into the core. This surfactant solution contained:

| | |
|---|---|
| TRS Witco 10-410 (62% active ingredient) 3.6 wt. % active total: | 8.71 g |
| Acrylonitrile 3.0 wt. %: | 4.50 g |
| NaCl 2.2 wt. %: | 3.3 g |
| Distilled Water: | 133.49 g |

The surfactant solution had a viscosity of 2.6 cp, measured in a Brookfield viscometer at 6 rpm and 120° F.

Following the surfactant solution, 423.5 cc (50 pore volume percent) of a mobility buffer solution was introduced into the core. The measured polymer solution viscosity was determined to be 40.1 cp at 6 rpm and 120° F. measured in a Brookfield viscometer. The starting mobility buffer solution was an 1800 ppm polyacrylamide solution in distilled water. This solution was continuously withdrawn and injected into the core while fresh water was added to the solution, thereby achieving a logarithmic dilution of the mobility buffer solution. The water that was added to the mobility buffer solution in order to achieve the logarithmic dilution was fresh water containing the following ingredients per liter of water.

| | |
|---|---|
| NaCl | 0.35 g |
| CaCl$_2$ | 0.15 g |
| MgCl$_2$.6H$_2$O | 0.11 g |

In the following Table IV the recovered volumes of oil and water are shown as well as the pressure and the elapsed time.

TABLE IV

| Vol. Oil (mL) | Vol. H$_2$O (mL) | Press. (psi) | Elapsed Time (min) |
|---|---|---|---|
| | 60.0 | 3.0 | 369.7 |
| | 85.4 | | 869.7 |
| | 81.9 | 3.9 | 1343.5 |
| 13.0 | 74.0 | 4.0 | 1848.8 |
| 43.0 | 43.0 | | |
| 37.0 | 44.0 | 4.0 | 2826.3 |
| 43.0 | 43.0 | 4.8 | 3331.0 |
| 36.0 | 48.0 | | |
| 26.0 | 43.0 | 11.0 | 4239.3 |
| 23.6 | 53.6 | 12.0 | 4733.5 |
| 12.8 | 64.0 | | |
| 2.0 | 69.0 | 18.0 | 5690.0 |
| 1.0 | 75.0 | 20.0 | 6184.5 |
| VST[1] | 574.0 | 28.0 | 10005.6 |
| VST[1] | 83.0 | 29.0 | 10517.9 |

[1]Very small trace

Adding up the recovered oil volumes it can be seen that a total of 237.4 mL of oil were recovered of the 312.4 mL of oil in the core. This amounts to a total recovery of 76.0%.

By titration with Hyamine the quantity of petroleum sulfonate in the oil and in the water phase was determined. It was found that 69.7% of the injected sulfonates were recovered.

EXAMPLE V

Example IV was repeated with the following variations.

| | |
|---|---|
| Pore volume of the core: | 856 cc |
| Type of Brine: | 30,000 ppm NaCl in distilled water |
| Core properties: | |
| Original perm to water: | 5.4 cc/min. (at 4.3 psi) |
| Oil perm at brine: | 6.2 cc/min. (at 22.5 psi) |
| Perm after waterflood: | 5.6 cc/min. (at 30.5 psi) |

The following table is a listing of the volumes of the water and oil displaced or respectively remaining in the cores.

| | |
|---|---|
| Water displaced by oilfood: | 615 cc (total) |
| Oil displaced by waterflood: | 301 cc (total) |
| Oil remaining in core: | 315 cc (total) |

In this example 64.2 cc of a surfactant solution having a viscosity of 5.1 cp at 6 rpm and 120° F. determined in a Brookfield viscometer were injected into the core. The composition of the surfactant solution was as follows:

| | |
|---|---|
| Witco 10-410 (62% active ingredient) 3.6 wt. % active: | 8.71 g |
| Acrylonitrile 3.0 wt. %: | 4.50 g |
| NaCl 2.7 wt. %: | 4.05 g |
| Distilled water: | 132.74 g |

Following the surfactant solution, 0.5 pore volume of a mobility buffer solution using the same polyacrylamide Betz Hi Vis commercially available from Betz Chemical Co. was injected into the core. The polymer solution viscosity was 40.1 cp at 6 rpm and 120° F. determined in the Brookfield viscometer.

The following Table V shows the volume of oil and water recovered. The table also shows the pressure and the elapsed time for the respective measurements.

TABLE V

| Vol. Oil (mL) | Vol. H$_2$O (mL) | Press. (psi) | Elapsed Time (min) |
|---|---|---|---|
| | 58.0 | 4.7 | 369.7 |
| | 79.0 | | 869.7 |
| | 73.9 | 3.0 | 1343.5 |
| 1.0 | 78.0 | 3.4 | 1848.8 |
| 32.0 | 45.0 | | |
| 34.0 | 40.0 | 3.0 | 2826.3 |
| 34.0 | 44.0 | 3.2 | 3331.0 |
| 30.0 | 47.0 | | |
| 23.0 | 39.0 | 3.0 | 4239.3 |
| 23.0 | 48.0 | 3.0 | 4733.6 |
| 16.9 | 53.0 | | |
| 14.0 | 48.0 | 5.0 | 5690.0 |
| 11.5 | 55.0 | 5.6 | 6184.5 |
| 15.0 | 440.0 | 9.5 | 10005.6 |
| VST[1] | 64.0 | 9.8 | 10517.6 |

[1]Very small trace

Adding the volumes of oil recovered shows that 234.4 mL of oil out of the 314 mL oil in the core have been recovered. This amounts to a tertiary oil recovery of 74.6%.

In this example, too, the total quantity of petroleum sulfonates recovered both in the oil and in the water were determined by titration with 0.001952 normal Hyamine solution. It was determined that the recovery of the sulfonate charged was 55.9%.

EXAMPLE VI

Example IV was again essentially repeated except for the conditions and details specified in the following:

The pore volume of the core utilized was 861 cc.

Type of Brine: 12,000 ppm NaCl in fresh water containing per liter of H$_2$O the following ingredients:

| | |
|---|---|
| NaCl | 0.35 g |
| CaCl$_2$ | 0.15 g |
| MgCl$_2$.6H$_2$O | 0.11 g |
| Original perm io water: | 5.8 cc/min. (at 4.5 psi) |
| Oil perm at brine: | 6.2 cc/min. (at 21.3 psi) |
| Perm after waterflood: | 5.0 cc/min. (at 28.5 psi) |

The following table is a listing of the volumes of the water and oil displaced or respectively remaining in the cores.

| | |
|---|---|
| Water displaced by oilflood: | 615 cc (total) |
| Oil displaced by waterflood: | 287 cc (total) |
| Oil remaining in core: | 328 cc (total) |

In this example 64.5 cc of a surfactant solution having a viscosity of 2.0 cp at 6 rpm and 120° F. determined in the Brookfield viscometer were introduced into the core. The surfactant solution contained the following ingredients:

| | |
|---|---|
| Witco 10-410 (62% active ingredient) 3.6 wt. % active: | 8.71 g |
| Acrylonitrile 3.0 wt. %: | 4.50 g |
| NaCl 1.2 wt. %: | 1.80 g |
| Distilled water containing per liter 0.35 g NaCl | 134.99 g |
| CaCl$_2$ | 0.15 g |
| MgCl$_2$.6H$_2$O | 0.11 g |

Following the surfactant solution, introduction of 0.5 pore volume of a polymer mobility buffer solution comprising the same ingredients as in Example IV was introduced. The viscosity of this solution had been determined to be 40.5 cp at 6 rpm and 120° F.

The following Table VI again shows the volume of the recovered oil, the volume of the recovered aqueous phase, the pressure and the elapsed time when the measurement was made.

TABLE VI

| Vol. Oil (mL) | Vol. H$_2$O (mL) | Press. (psi) | Elapsed Time (min) |
|---|---|---|---|
| | 60.2 | 4.7 | 439.5 |
| | 48.0 | | 939.5 |
| | 53.0 | 2.0 | 1373.9 |
| | 30.0 | 2.0 | 1890.0 |
| 5.0 | 37.5 | | 2390.0 |
| 6.0 | 35.0 | 2.5 | 2824.0 |
| 24.0 | 25.0 | 2.2 | 3304.0 |
| 19.0 | 14.0 | 2.1 | |
| 16.2 | 17.8 | 2.0 | 5477.0 |
| 13.3 | 21.5 | 3.5 | 5777.0 |
| 36.0 | 28.5 | | |
| 39.4 | 38.5 | 3.2 | 6807.0 |
| 43.1 | 38.4 | 3.2 | |
| 78.5 | 85.1 | 13.4 | 8274.0 |
| 33.0 | 414.0 | 13.6 | 10865.0 |

Adding up the volumes of oil, one finds that 309.0 mL of the 328 mL of oil present in the core have been recovered. This amounts to an oil recovery of 94.2%.

As in the previous examples, the quantity of sulfonate recovered was determined by multiple titrations. It was found that 61% of the sulfonate injected was recovered in the operation.

EXAMPLE VII

Example IV was repeated except for the conditions and details specified in the following:

The pore volume of the core utilized was 828 cc.

Type of Brine: 1.7 wt.% NaCl in fresh water containing per liter of $H_2O$ the following ingredients:

| NaCl | 0.35 g |
|---|---|
| $CaCl_2$ | 0.15 g |
| $MgCl_2 \cdot 6H_2O$ | 0.11 g |
| Original perm to water: | 3.0 cc/min. (at 3.1 psi) |
| Oil perm at connate water:: | 6.1 cc/min. (at 27.8 psi) |
| Perm after waterflood: | 6.2 cc/min. (at 47.0 psi) |

The following table lists, respectively, the volumes of water and oil displaced or remaining in the cores:

| Water displaced by oilflood: | 586.5 cc |
|---|---|
| Oil displaced by waterflood: | 268.5 cc |
| Oil remaining in core: | 318.0 cc |

In the example 62.1 cc of a surfactant solution having a viscosity of 2.3 cp at 6 rpm and 120° F. determined in the Brookfield viscometer were introduced into the core. The surfactant solution contained the following ingredients:

| Witco TRS 10-410 (62% active) | 8.71 g |
|---|---|
| 3.6 wt. % active: | |
| Acrylonitrile 3.0 wt. %: | 4.50 g |
| NaCl 1.7 wt. %: | 3.3 g |
| Water*: | 134.24 g |

*The composition of this water is the same as the fresh water described above under "type of brine".

The following Table VII again shows the volume of the recovered oil, the volume of the recovered aqueous phase, the pressure and the elapsed time when the measurement was made.

TABLE VII

| Vol. Oil (mL) | Vol. $H_2O$ (mL) | Press. (psi) | Elapsed Time (min) |
|---|---|---|---|
| 0 | 62.9 | 0 | 347.4 |
| 14.0 | 178.0 | 2.1 | 1350.7 |
| 122.0 | 134.0 | 1.5 | 2769.6 |
| 122.9 | 110.9 | 1.0 | 4209.6 |
| 20.0 | 60.0 | 0 | 5674.6 |
| 7.9 | 228.0 | 0 | 5900.3 |
| 0 | 444.5 | — | 9504.8 |

In this example the total oil recovery was 286.8 ml. or 90.1%. The sulfonate recovery amounted to 52.3%.

The above examples have shown the efficiency and desirability of the use of nitriles as cosurfactant in surfactant flooding operations for oil recovery.

Reasonable variations and modifications which will become apparent to those skilled in the art can be made in this invention without departing from the spirit and scope thereof.

I claim:

1. Surfactant composition comprising
   (a) 100 parts by weight of water,
   (b) 0.1 to 15 active parts by weight of hydrocarbon sulfonate,
   (c) 0.05 to 15 parts by weight of an organic nitrile cosurfactant having one to three —CN groups attached to a molecule containing up to thirteen carbon atoms and up to four oxygen and/or sulfur atoms and up to four additional nitrogen atoms,
   (d) 0.1 to 8 parts by weight of NaCl.
2. Composition in accordance with claim 1 wherein said nitrile cosurfactant has the formula $$R-(CN)_n$$

wherein R is a n-valent radical selected from the group consisting of alkyl, alkylene, alkenyl, alkenylene, aryl, or aralkyl and n varies over the range of 1 to 3 with the proviso that the total number of carbon atoms in the nitrile does not exceed 13.
3. Composition in accordance with claim 2 wherein said nitrile cosurfactant is acrylonitrile.
4. Composition in accordance with claim 2 wherein said hydrocarbon sulfonate is a petroleum sulfonate having an equivalent weight in the range of 325 to 600.
5. Composition in accordance with claim 2 comprising
   1 to 12 parts by weight of said hydrocarbon sulfonate,
   1 to 7 parts by weight of said nitrile cosurfactant.
6. Composition in accordance with claim 2 further comprising 0.01 to 3 parts by weight of a protective agent selected from the group consisting of polyethoxylated fatty alcohols, polyethoxylated alkyl phenols, sodium salts of sulfated polyethoxylated fatty alcohols and sodium salts of sulfated polyethoxylated alkyl phenols.
7. Surfactant composition comprising
   (a) 100 parts by weight of water,
   (b) 0.1 to 15 parts by weight of a petroleum sulfonate having an equivalent weight in the range of 325 to 600,
   (c) 0.05 to 15 parts by weight of an organic nitrile cosurfactant having the formula $$R-(CN)_n$$

wherein R is a n-valent radical selected from the group consisting of alkyl, alkylene, alkenyl, alkenylene, aryl, or aralkyl and n varies over the range of 1 to 3 with the proviso that the total number of carbon atoms in the nitrile does not exceed 13,
   (d) 0.01 to 3 parts by weight of a protective agent selected from the group consisting of polyethoxylated fatty alcohols, polyethoxylated alkylphenols, sodium salts of sulfated polyethoxylated fatty alcohols and sodium salts of sulfated polyethoxylated alkylphenols,
   (e) 0.1 to 8 parts by weight of NaCl.
8. Composition in accordance with claim 7 comprising
   1 to 12 parts by weight of said petroleum sulfonate,
   1 to 7 parts by weight of said organic nitrile cosurfactant, and
   0.05 to 2 parts by weight of said protective agent.
9. Composition in accordance with claim 7 wherein said nitrile cosurfactant is acrylonitrile.

* * * * *